(12) United States Patent
Inoue

(10) Patent No.: US 11,341,783 B2
(45) Date of Patent: May 24, 2022

(54) GUIDANCE SYSTEM AND GUIDANCE METHOD

(71) Applicant: TOYOTA JIDOSHA KABUSHIKI KAISHA, Toyota (JP)

(72) Inventor: Naoya Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 16/785,735

(22) Filed: Feb. 10, 2020

(65) Prior Publication Data

US 2020/0279441 A1 Sep. 3, 2020

(30) Foreign Application Priority Data

Mar. 1, 2019 (JP) .............................. JP2019-037457

(51) Int. Cl.
| | | |
|---|---|---|
| G07C 5/00 | (2006.01) | |
| B60K 35/00 | (2006.01) | |
| G07C 5/02 | (2006.01) | |
| B60W 50/14 | (2020.01) | |
| B60W 50/00 | (2006.01) | |
| G09B 19/16 | (2006.01) | |
| G07C 5/08 | (2006.01) | |

(52) U.S. Cl.
CPC .............. *G07C 5/008* (2013.01); *B60K 35/00* (2013.01); *G07C 5/02* (2013.01); *G07C 5/0825* (2013.01); *G07C 5/0833* (2013.01); *B60K 2370/166* (2019.05); *B60K 2370/167* (2019.05)

(58) Field of Classification Search
USPC ........................................................ 701/33.4
See application file for complete search history.

(56) References Cited

U.S. PATENT DOCUMENTS

| | | | | |
|---|---|---|---|---|
| 2012/0226391 | A1* | 9/2012 | Fryer ...................... | G08G 1/202 |
| | | | | 701/1 |
| 2013/0179062 | A1* | 7/2013 | Yasushi ................... | G06F 17/00 |
| | | | | 701/123 |
| 2014/0212849 | A1 | 7/2014 | Naiwala et al. | |
| 2015/0035666 | A1 | 2/2015 | Scofield et al. | |
| 2016/0159366 | A1 | 6/2016 | Tsuyunashi et al. | |
| 2017/0010122 | A1* | 1/2017 | Abe ................. | G08G 1/096758 |
| 2017/0284824 | A1* | 10/2017 | Korzunov .......... | G01C 21/3694 |
| 2017/0309092 | A1* | 10/2017 | Rosenbaum ........ | G01M 17/007 |
| 2019/0016341 | A1* | 1/2019 | Nelson .................. | B60W 40/06 |
| 2020/0279441 | A1* | 9/2020 | Inoue ....................... | G07C 5/02 |

FOREIGN PATENT DOCUMENTS

| | | |
|---|---|---|
| EP | 3002655 A1 | 4/2016 |
| JP | 2002-297017 A | 10/2002 |
| JP | 2010-066827 A | 3/2010 |
| KR | 10-2016-0130179 A | 11/2016 |

* cited by examiner

*Primary Examiner* — Tyler D Paige
(74) *Attorney, Agent, or Firm* — Oliff PLC

(57) ABSTRACT

A guidance system provides a driver of a vehicle with guidance on a driving operation, and includes a server device that accumulates past traveling records on a traveling road on which the vehicle travels, an acquisition device that acquires a current state of the vehicle, and a notification device that notifies the driver, while driving, of the operation content determined based on the current state of the vehicle and the past traveling records.

9 Claims, 4 Drawing Sheets

FIG. 3

| TRAVELING RECORD NUMBER | DATE AND TIME | WEATHER | ROAD SURFACE TEMPERATURE | TYPE OF VEHICLE | TYPE OF TIRE | VEHICLE TRAVELING TIME | VEHICLE TRAVELING INFORMATION | VEHICLE OPERATION INFORMATION |
|---|---|---|---|---|---|---|---|---|
| R1 | R1a | R1b | R1c | R1d | R1e | R1f | R1g | R1h |
| R2 | R2a | R2b | R2c | R2d | R2e | R2f | R2g | R2h |
| ... | ... | ... | ... | ... | ... | ... | ... | ... |

GUIDANCE SYSTEM AND GUIDANCE METHOD

INCORPORATION BY REFERENCE

The disclosure of Japanese Patent Application No. 2019-037457 filed on Mar. 1, 2019 including the specification, drawings and abstract is incorporated herein by reference in its entirety.

BACKGROUND

1. Technical Field

The present disclosure relates to a guidance system and a guidance method.

2. Description of Related Art

A riding simulation apparatus that allows an operator of a simulated vehicle to experience a simulated traveling state is known (see, for example, Japanese Unexamined Patent Application Publication No. 2002-297017 (JP 2002-297017 A)).

The riding simulation apparatus disclosed in JP 2002-297017 A is configured such that a traveling scene screen and a traveling map screen are simultaneously displayed on a monitor observed by an instructor. Video presented to the operator of the simulated vehicle is displayed on the screen displaying a traveling scene, and the position of the simulated vehicle, or the like, on the traveling map is displayed on the screen displaying a traveling map. Therefore, the instructor can easily check the position of the simulated vehicle and provide appropriate advice to the operator of the simulated vehicle.

SUMMARY

However, even though it is possible to provide advice to the operator of the simulated vehicle in the riding simulation apparatus disclosed in JP 2002-297017 A, it is not possible to provide a driver who is actually driving a real vehicle with guidance on a driving operation.

The present disclosure has been made to solve the above shortcoming, and aims to provide a guidance system and a guidance method that can provide a driver who is actually driving a real vehicle with guidance on a driving operation.

A guidance system according to the present disclosure provides a driver of a vehicle with guidance on a driving operation. The guidance system includes a server device that accumulates past traveling records on a road on which the vehicle travels, an acquisition device that acquires a current state of the vehicle, and a notification device that notifies the driver, while driving, of the operation content determined based on the current state of the vehicle and the past traveling records.

With the above configuration, since the operation content determined based on the current state of the vehicle and the past traveling records is notified to the driver, while driving, it is possible to provide the driver, who is actually driving a real vehicle, with guidance on the driving operation. In other words, since the driver can receive guidance on the driving operation in real time, while driving, it is possible to easily improve the driving skill of the driver.

In the above guidance system, the acquisition device may be connected to an in-vehicle network of the vehicle and provided with a receiver of a satellite positioning system.

The acquisition device may be configured to determine the current state of the vehicle based on traveling information from the in-vehicle network and position information from the receiver. The server device may accumulate a large number of traveling records, and each traveling record may include vehicle traveling time at the time of recording, vehicle traveling information at the time of recording, and vehicle operation information at the time of recording. The server device may be configured to extract traveling records matching the current state of the vehicle from among the large number of traveling records, to select a traveling record having a short vehicle traveling time from among the extracted traveling records, and to determine the operation content using the vehicle operation information of the selected traveling record.

In this case, each traveling record may include the type of the vehicle at the time of recording and the type of a tire of the vehicle at the time of recording. The notification device may be configured to set the type of the vehicle driven by the driver and the type of the tire of the vehicle driven by the driver. The server device may be configured to extract traveling records matching the current state of the vehicle, the type of the vehicle driven by the driver, and the type of the tire of the vehicle driven by the driver from among the large number of traveling records, to select a traveling record having a short vehicle traveling time from among the extracted traveling records, and to determine the operation content using the vehicle operation information of the selected traveling record.

In this case, each traveling record may include the weather of the traveling road at the time of recording and the road surface temperature of the traveling road at the time of recording. The server device may be configured to acquire the weather of the traveling road of the vehicle driven by the driver and the road surface temperature of the traveling road of the vehicle driven by the driver. The server device may be configured to extract traveling records matching the current state of the vehicle, the type of the vehicle driven by the driver, the type of the tire of the vehicle driven by the driver, the weather of the traveling road of the vehicle driven by the driver, and the road surface temperature of the traveling road of the vehicle driven by the driver from among the large number of traveling records, to select the traveling record having the short vehicle traveling time from among the extracted traveling records, and to determine the operation content using the vehicle operation information of the selected traveling record.

In the above guidance system, the operation content to be notified to the driver may include at least one of an accelerator operation, a brake operation, a steering operation, and a shift operation.

In the above guidance system, the notification device may be configured to notify the operation content by stimulating at least one of the visual, auditory, and tactile sensations of the driver.

A guidance method according to the present disclosure provides a driver of a vehicle with guidance on a driving operation. The guidance method includes a step of acquiring, by an acquisition device, a current state of the vehicle, and a step of notifying, by a notification device, the driver, while driving, of the operation content determined based on the current state of the vehicle and past traveling records on a traveling road on which the vehicle travels, which are accumulated in a server device.

With the above configuration, since the operation content, determined based on the current state of the vehicle and the past traveling record, is notified to the driver, while driving, it is possible to provide the driver who is actually driving a real vehicle with guidance on a driving operation. In other words, since the driver can receive, driving operation guidance in real time while driving, it is possible to easily improve the driving skill of the driver.

With a guidance system and a guidance method of the present disclosure, it is possible to provide a driver who is actually driving a real vehicle with guidance on a driving operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram for describing a traveling record database stored in a server device of the guidance system in FIG. 1.

DETAILED DESCRIPTION OF EMBODIMENTS

Figure 1:
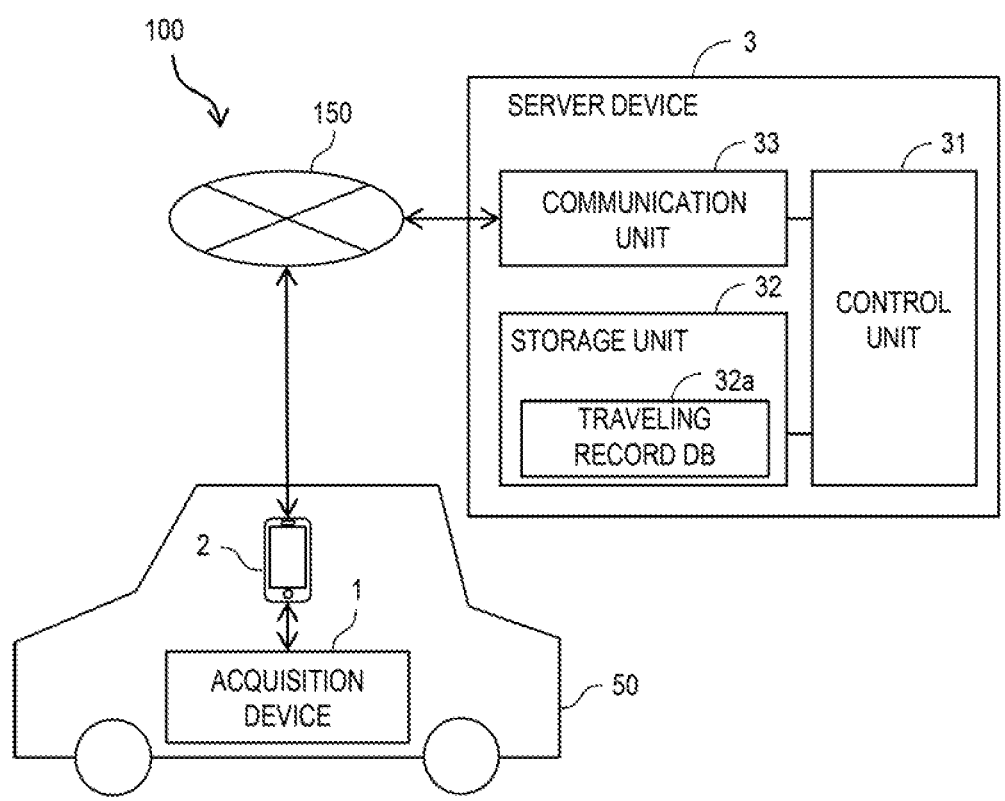
FIG. 1 is a block diagram illustrating a schematic configuration of a guidance system according to the present embodiment.

Hereinafter, an embodiment of the present disclosure will be described with reference to the drawings.

First, a configuration of a guidance system 100 according to an embodiment of the present disclosure will be described with reference to FIGS. 1 to 3.

The guidance system 100 is provided, for example, in order to improve the driving skill of a driver who performs a circuit traveling. The guidance system 100 is configured to provide (coach) the driver who is actually driving a real vehicle 50 with guidance on a driving operation. Specifically, as illustrated in FIG. 1, the guidance system 100 includes an acquisition device 1, a smartphone 2, and a server device 3.

Acquisition Device

The acquisition device 1 is mounted on a vehicle 50 that travels on a circulating road of a circuit and is configured to acquire a current state of the vehicle 50. As illustrated in FIG. 2, the acquisition device 1 includes an acquisition terminal 11 and a global positioning system (GPS) receiver 12. An in-vehicle network 51 of the vehicle 50 and the GPS receiver 12 are connected to the acquisition terminal 11. In addition, the circulating road of the circuit is an example of a "traveling road" in the present disclosure.

Here, the in-vehicle network 51 of the vehicle 50 includes a gateway ECU (hereinafter referred to as "GW-ECU") 52 and a plurality of buses 53 connected to the GW-ECU 52. A plurality of ECUs 54 is connected to each bus 53.

The ECU 54 is configured to control each unit of the vehicle 50. The bus 53 is a transmission path used when the ECU 54 communicates. For example, a controller area network (CAN) is used as a communication protocol. The GW-ECU 52 is provided to relay communication between the plurality of buses 53.

When the ECU 54 has transmitted a message to a bus 53, the ECUs 54 other than the transmission source connected to the bus 53 receive the message, the message is transferred to the other buses 53 by the GW-ECU 52, and the ECUs 54 connected to the other buses 53 receive the message. In other words, in the in-vehicle network 51, since the message is relayed by the GW-ECU 52, communication is also possible between the ECUs 54 connected to different buses 53. The ECU 54 is configured to transmit, as a message, traveling information (behavior information) of the vehicle 50 to the bus 53. The traveling information of the vehicle 50 includes, for example, speed (vehicle speed) and horizontal acceleration of the vehicle 50.

The acquisition terminal 11 includes a microcomputer 11a that controls the acquisition terminal 11, a transceiver 11b connected to the microcomputer 11a, and an input and output unit 11c. The transceiver 11b is connected to the bus 53 of the in-vehicle network 51, and the input and output unit 11c is connected to the GPS receiver 12, the smartphone 2, and the like. When the traveling information of the vehicle 50 is transmitted from the ECU 54 to the bus 53, the microcomputer 11a is configured to acquire the traveling information of the vehicle 50 via the transceiver 11b.

The GPS receiver 12 is configured to receive a signal from a GPS satellite (not shown) and calculate current position information. The position information calculated by the GPS receiver 12 is output to the acquisition terminal 11. Moreover, the GPS is an example of the "satellite positioning system" in the present disclosure, and the GPS receiver 12 is an example of the "receiver" in the present disclosure.

The acquisition terminal 11 is configured to determine the current state of the vehicle 50 based on the position information from the GPS receiver 12 and the traveling information from the in-vehicle network 51. Furthermore, the acquisition terminal 11 has a function of outputting the current state of the vehicle 50 to the smartphone 2. The current state of the vehicle 50 includes, for example, the position of the vehicle 50, the direction of the vehicle 50, the speed of the vehicle 50, and horizontal acceleration of the vehicle 50.

Smartphone

The smartphone 2 is attachably and detachably attached to a holder (not shown) inside the cabin of the vehicle 50. The smartphone 2 is connected to the acquisition terminal 11 via a near-field wireless communication standard, such as Bluetooth®, and the current state of the vehicle 50 is input from the acquisition terminal 11 to the smartphone 2. In addition, the smartphone 2 is capable of accepting an operation by the driver and registering vehicle information. The vehicle information includes, for example, the type of the vehicle 50, and the type of the tire of the vehicle 50. Moreover, the smartphone 2 is an example of "a notification device" in the present disclosure.

Figure 2:
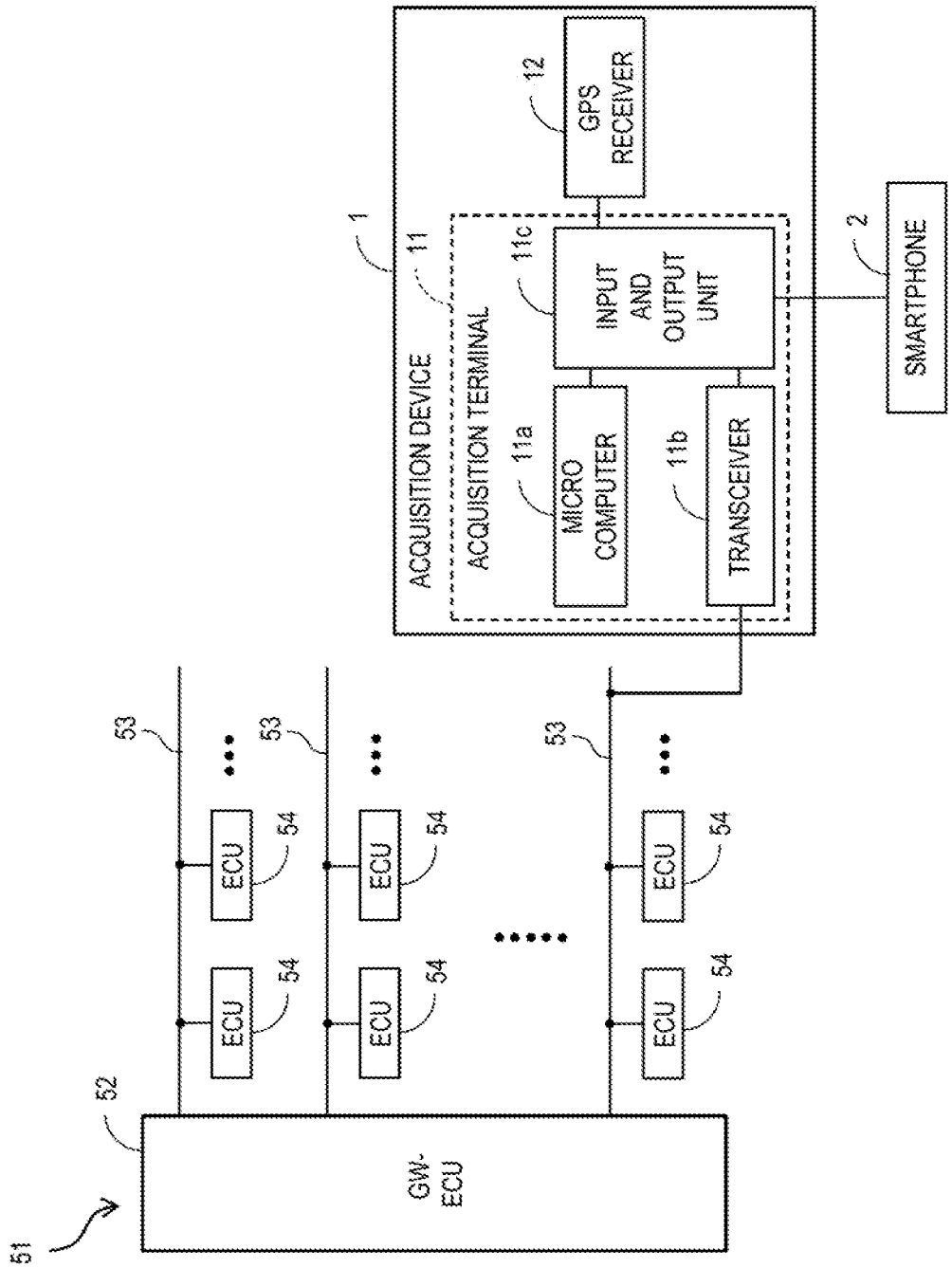
FIG. 2 is a block diagram for describing an acquisition device of a guidance system in FIG. 1.

As illustrated in FIG. 1, the smartphone 2 can communicate with the server device 3 via a network 150, and is configured to transmit the current state and the vehicle information of the vehicle 50 to the server device 3. As will be described below in detail, the server device 3 is configured to determine the operation content based on the current state and the vehicle information of the vehicle 50, and transmit the determined operation content to the smartphone 2. In addition, the smartphone 2 is connected to the server device 3 by a wireless communication system, such as a fourth generation mobile communication system.

Furthermore, the smartphone 2 is configured to notify the driver, while driving, of the operation content received from the server device 3. The operation content to be notified to the driver is, for example, an accelerator operation, a brake operation, a steering operation, and a shift operation, and the start timing of each operation is notified to the driver. The smartphone 2 is provided with a speaker (not shown), and audio corresponding to each operation content is output from the speaker, such that the operation content is notified to the driver. In other words, the operation content is notified to the driver by stimulating the driver's auditory sensation. Specifically, the smartphone 2 is configured to output audio, from the speaker, a first predetermined time before the start timing of each operation guided by the guidance system 100. The first predetermined time is a value (for example, 0.3 seconds) set in advance in consideration of the time (response time) from the output of the audio to the start of the operation by the driver.

Server Device

The server device 3 is provided to determine the operation content to be notified to the driver of the vehicle 50. The server device 3 is capable of acquiring the weather and the road surface temperature of the circuit. The weather and the road surface temperature of the circuit are derived based on, for example, the detection result of a sensor (not shown) installed on the circuit, and are received by the server device 3 via the network 150. The server device 3 accumulates a large number of past traveling records on the circulating road, and is configured to determine the operation content based on the large number of traveling records and information from the smartphone 2, and transmit the operation content to the smartphone 2. In other words, the server device 3 is configured to select the traveling record matching the current state of the vehicle 50 from among the large number of traveling records, and to determine the operation content using the selected traveling record.

The server device 3 includes a control unit 31, a storage unit 32, and a communication unit 33. The control unit 31 is configured to control the server device 3 by performing calculation processing. The storage unit 32 stores a traveling record database (hereinafter referred to as "a traveling record DB") 32a in which the large number of traveling records are accumulated. The communication unit 33 is provided to communicate with the smartphone 2 via the network 150.

The traveling record DB 32a includes the traveling records in which various vehicles travel on the circulating road under various conditions. There are also various types of vehicle drivers at the time of traveling recording. As illustrated in FIG. 3, for example, nine items are set in the traveling record DB 32a. Specifically, as the items of the traveling record DB 32a, a traveling record number, a date and time when the traveling is performed (a recording date and time), the weather of the circuit at the time of recording, the road surface temperature of the circuit at the time of recording, the type of the vehicle at the time of recording, the type of the tire of the vehicle at the time of recording, vehicle traveling time at the time of recording, vehicle traveling information at the time of recording, and vehicle operation information at the time of recording are set. In other words, each traveling record includes the content of nine items.

The vehicle traveling time includes lap time and sector time. The lap time is the time required for the vehicle to travel once around the circulating road. The circulating road of the circuit is divided into a plurality of sectors (areas), and the sector time is the time required to travel in each sector. The vehicle traveling information includes, for example, a change over time in the position of the vehicle, the direction of the vehicle, the speed of the vehicle, and the horizontal acceleration of the vehicle while the vehicle travels once around the circulating road. The vehicle operation information includes, for example, a change over time in an accelerator operation, a brake operation, a steering operation, and a shift operation while the vehicle travels once around the circulating road. Therefore, it is possible to understand, from the traveling record, the traveling track, and the vehicle behavior and the driver operation at each position on the traveling track while the vehicle travels once around the circulating road.

Operation Example of Guidance System

Next, an operation example (the guidance method) of the guidance system 100 according to the present embodiment will be described with reference to FIG. 4. Further, vehicle information (the type of the vehicle 50 and the type of the tire of the vehicle 50) is registered in the smartphone 2 in advance before the following operation is started.

Figure 4:
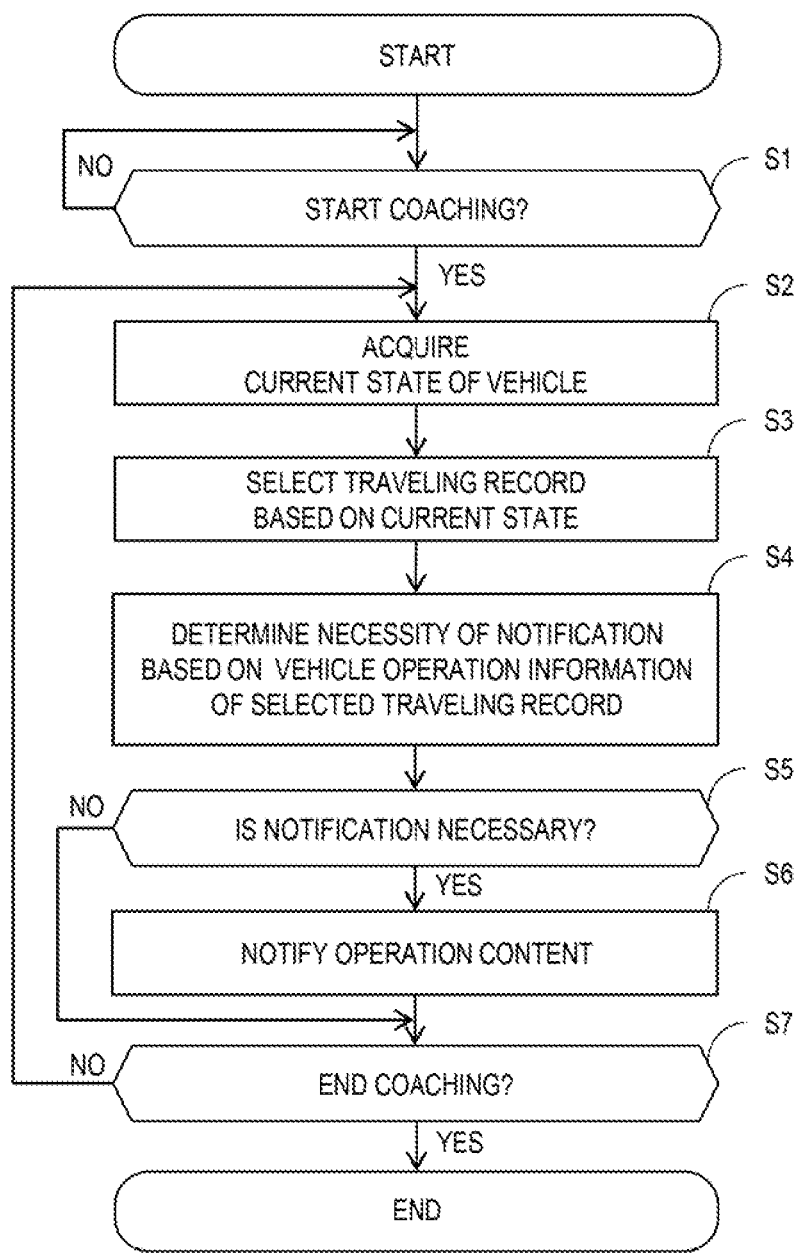
FIG. 4 is a flowchart for describing an operation example of the guidance system according to the present embodiment.

First, in step S1 in FIG. 4, the smartphone 2 determines whether guidance (coaching) of the driving operation is started by the guidance system 100. For example, when the smartphone 2 accepts a guidance start operation, the smartphone 2 determines that the guidance of the driving operation has been started. When the smartphone 2 determines that the guidance of the driving operation has been started, the smartphone 2 transmits the vehicle information to the server device 3, the server device 3 acquires the weather and the road surface temperature of the circuit, and the process proceeds to step S2. On the other hand, when the smartphone 2 determines that the guidance of the driving operation has not been started, step S1 is repeated.

Next, in step S2, the acquisition device 1 acquires the current state of the vehicle 50. Specifically, the acquisition terminal 11 determines the current state of the vehicle 50 based on the position information from the GPS receiver 12 and the traveling information from the in-vehicle network 51. Then, the acquisition terminal 11 transmits the current state of the vehicle 50 to the smartphone 2, and the smartphone 2 transmits the current state of the vehicle 50 to the server device 3. In addition, the current state of the vehicle 50 includes, for example, the position of the vehicle 50, the direction of the vehicle 50, the speed of the vehicle 50, and the horizontal acceleration of the vehicle 50.

Next, in step S3, the server device 3 selects the traveling record from among the traveling record DB 32a based on the current state of the vehicle 50, the vehicle information, and the weather and the road surface temperature of the circuit. Specifically, the server device 3 extracts, from among the traveling record DB 32a, the traveling records matching the position of the vehicle 50, the direction of the vehicle 50, the speed of the vehicle 50, the horizontal acceleration of the vehicle 50, the type of the vehicle 50, the type of the tire of the vehicle 50, the weather of the circuit, and the road surface temperature of the circuit. In other words, the server device 3 extracts, from among the large number of past traveling records, the traveling records in which a vehicle situation similar to the current vehicle situation has been experienced. Then, the server device 3 selects, from among the extracted traveling records, a traveling record having a short vehicle traveling time. For example, a traveling record having a short sector time for the sector where the vehicle 50 is currently located is selected. In other words, the server device 3 selects, from among the large number of past traveling records, the traveling record that the driver should follow according to the current vehicle situation.

Next, in step S4, the server device 3 determines the necessity of notifying the driver of the driving operation based on the vehicle operation information of the selected traveling record. Specifically, in the vehicle operation information of the selected traveling record, in a case in which the driving operation (the accelerator operation, the brake operation, the steering operation, or the shift operation) has been started after a second predetermined time elapses from the current time, the server device 3 determines that the notification of the driving operation is necessary, and determines the operation content to be notified to the driver. Furthermore, in the vehicle operation information of the selected traveling record, in a case in which the driving operation (the accelerator operation, the brake operation, the steering operation, or the shift operation) has not been started after the second predetermined time elapses from the current time, the server device 3 determines that the notification of the driving operation is not necessary. The second predetermined time is a value set in advance in consideration of the time from the start of the notification of the driving operation by the server device 3 to the start of the driving operation by the driver, and the value is obtained by, for example, adding the first predetermined time to the time required for the server device 3 and the smartphone 2 to communicate.

In step S5, when the server device 3 determines that the notification of the driving operation is necessary, the process proceeds to step S6. On the other hand, when the server device 3 determines that the notification of the driving operation is not necessary (when the notification of the driving operation is unnecessary), the process proceeds to step S7.

Next, in step S6, the server device 3 transmits the determined operation content to the smartphone 2, and the smartphone 2 outputs, from the speaker thereof, audio corresponding to the operation content. The smartphone 2 outputs audio, from the speaker, the first predetermined time before the start timing (the start timing of an operation in the selected traveling record) of an operation guided by the guidance system 100. The first predetermined time is a value set in advance in consideration of the time from the output of the audio to the start of the operation by the driver. Therefore, the driver who hears the output audio starts the operation corresponding to the audio, such that the operation is started at an appropriate timing.

Next, in step S7, the smartphone 2 determines whether the guidance of the driving operation by the guidance system 100 is ended. For example, when the smartphone 2 accepts a guidance end operation, the smartphone 2 determines that the guidance of the driving operation has been ended. Then, when the smartphone 2 determines that the guidance of the driving operation has not been ended, the process returns to step S2. On the other hand, when the smartphone 2 determines that the guidance of the driving operation has been ended, the process is ended.

Advantageous Effects

As described above, in the present embodiment, the server device 3 that accumulates past traveling records on the circulating road of the circuit on which the vehicle 50 travels, the acquisition device 1 that acquires the current state of the vehicle 50, and the smartphone 2 that notifies the driver, while driving, of the operation content determined based on the current state of the vehicle 50 and the past traveling records are provided. With the above configuration, since the operation content determined based on the current state of the vehicle and the past traveling records is notified to the driver while driving, it is possible to provide the driver who is actually driving a real vehicle 50 with guidance on a driving operation. In other words, since the driver can receive the driving operation guidance in real time while driving, it is possible to easily improve the driving skill of the driver. Furthermore, since the operation content is determined based on the current state of the vehicle 50 and the past traveling records, it is possible to notify the driver of the appropriate operation content according to the situation, or the like, of the vehicle 50 that changes moment by moment. Therefore, unlike a case in which the driver who receives the guidance is made to always follow a driving operation of a specific excellent driver, it is possible to curb a situation in which the driver who receives the guidance cannot follow the driving operation according to the driving skill of the driver, the situation of the circulating road of the circuit, or the like, and continuing the driving guidance is difficult.

Furthermore, in the present embodiment, by extracting the traveling record matching the current state of the vehicle 50, the type of the vehicle 50, and the type of the tire of the vehicle 50, it is possible to notify the driver of the appropriate operation content in consideration of the type of the vehicle 50 and the type of the tire of the vehicle 50.

Moreover, in the present embodiment, by extracting the traveling record matching the current state of the vehicle 50, the type of the vehicle 50, the type of the tire of the vehicle 50, the weather of the circuit, and the road surface temperature of the circuit, it is possible to notify the driver of the appropriate operation content in consideration of the weather of the circuit and the road surface temperature of the circuit.

In addition, in the present embodiment, by determining the current state of the vehicle 50 based on the position information from the GPS receiver 12 and the traveling information from the in-vehicle network 51, it is possible to obtain an accurate current state of the vehicle 50.

Other Embodiments

Furthermore, the embodiments disclosed herein are illustrative in all respects, and do not serve as a basis for limited interpretation. Therefore, the technical scope of the present disclosure is not interpreted only by the above-described embodiments, but is defined based on the description in the scope of claims. Moreover, the technical scope of the present disclosure includes all modifications within the meaning and the scope equivalent to the scope of claims.

For example, although the driving operation is provided to the driver who performs circuit traveling is described in the above embodiment, the present disclosure is not limited thereto, and the driving operation may be provided to a driver who performs rally traveling.

In addition, although the operation content is notified to the driver by the smartphone 2 in the above embodiment, the present disclosure is not limited thereto, and the operation content may be notified to the driver by a wearable computer (not shown), or the like.

Furthermore, although the acquisition device 1 is connected to the smartphone 2 in a wireless manner in the above embodiment, the present disclosure is not limited thereto, and the acquisition device may be connected to the smartphone in a wired manner.

Moreover, although the smartphone 2 is connected to the server device 3 with the fourth generation mobile communication system in the above embodiment, the present disclosure is not limited thereto, and the smartphone may be connected to the server device with another wireless communication system.

In addition, although the operation content to be notified to the driver includes the accelerator operation, the brake operation, the steering operation, and the shift operation, the present disclosure is not limited thereto, and the operation content to be notified to the driver may include at least one of the accelerator operation, the brake operation, the steering operation, and the shift operation. Furthermore, the operation content to be notified may be selectable by the driver. With the above configuration, it is possible to improve the driving skill step by step by, for example, gradually increasing the number of pieces of the operation content to be notified.

Moreover, although the operation start timing is notified in the above embodiment, the present disclosure is not limited thereto, and an operation amount and operation time may be notified in addition to the operation start timing.

In addition, although the operation content is notified by stimulating the driver's auditory sensation using the audio output from the speaker in the above embodiment, the present disclosure is not limited thereto, and the operation content may be notified by stimulating the driver's visual sensation using flashing of a lamp (not shown) of the smartphone, or the operation content may be notified by stimulating the driver's tactile sensation using vibrations of the smartphone. Furthermore, at the time of notification of the operation content, at least two of visual, auditory and tactile sensations may be simultaneously stimulated. In addition, a notification tool may be set according to the operation content to be notified. For example, the accelerator operation and the brake operation may be notified using the speaker, and the steering operation and the shift operation may be notified using the lamp.

Moreover, in the above embodiment, the first predetermined time and the second predetermined time may be changeable or fixed values. For example, the first predetermined time may be adjusted according to the driving skill of the driver.

Furthermore, although the server device 3 acquires the weather and the road surface temperature of the circuit in the above embodiment, the present disclosure is not limited thereto, and the weather and the road surface temperature of the circuit may be set in the smartphone and transmitted from the smartphone to the server device.

Moreover, although the smartphone 2 transmits the vehicle information to the server device 3, and the server device 3 acquires the weather and the road surface temperature of the circuit when the guidance on the driving operation is started in the above embodiment, the present disclosure is not limited thereto, and the smartphone transmits the vehicle information to the server device together with the current state of the vehicle, and the server device may acquire the weather and the road surface temperature of the circuit every time the current state of the vehicle and the vehicle information are received.

Furthermore, although the traveling record having the short sector time is selected from among the extracted traveling records in the above embodiment, the present disclosure is not limited thereto, and a traveling record having a short lap time may be selected from among the extracted traveling records.

Moreover, in the above embodiment, the traveling record having the shortest vehicle traveling time may be selected from among the extracted traveling records. In addition, an item of a driving skill level of the driver at the time of recording may be set in the traveling record DB 32a, and the smartphone 2 may be capable of setting the driving skill level of the driver, such that the traveling record matching the driving skill level is extracted.

Furthermore, in the above embodiment, the vehicle operation information may be acquired by the acquisition device 1 from the in-vehicle network 51, and transmitted to the server device 3. With the above configuration, the traveling record when the vehicle 50 travels the circulating road of the circuit may be accumulated in the traveling record DB 32a.

Moreover, although the type of the vehicle 50 is registered in the smartphone 2 in the above embodiment, the present disclosure is not limited thereto, and the type of the vehicle may be obtained by the acquisition device from the in-vehicle network and transmitted from the acquisition device to the smartphone.

In addition, in the above embodiment, an item of the tire pressure at the time of recording may be set to the traveling record DB 32a, and the tire pressure may be included in the traveling information which the acquisition device 1 acquires from the in-vehicle network 51, such that the traveling record matching the tire pressure is extracted.

Moreover, although the CAN is used as a communication protocol of the in-vehicle network 51 in the above embodiment, the present disclosure is not limited thereto, and a communication protocol other than the CAN may be used for the in-vehicle network.

Further, although the position information of the vehicle 50 based on the GPS is acquired in the above embodiment, the present disclosure is not limited thereto, and the position information of the vehicle based on a satellite positioning system other than the GPS may be acquired.

The present disclosure can be used for a guidance system and a guidance method that provides a driver of a vehicle with guidance on a driving operation.

What is claimed is:

1. A guidance system that provides a driver of a vehicle with guidance on a driving operation, the guidance system comprising:
   a server device configured to:
      accumulate past traveling records on a traveling road on which the vehicle travels; and
      accumulate a large number of traveling records, each of the traveling records including vehicle traveling time at a time of recording, vehicle traveling information at the time of recording, and vehicle operation information at the time of recording, wherein:
      the vehicle traveling information includes at least one of a change over time in a position of the vehicle, a direction of the vehicle, a speed of the vehicle, and a horizontal acceleration of the vehicle while the vehicle travels once around the traveling road; and
      the vehicle operation information includes at least one of a change over time in an accelerator operation, a brake operation, a steering operation, and a shift operation while the vehicle travels once around the traveling road;
   an acquisition device configured to acquire a current state of the vehicle; and a notification device configured to notify the driver, while driving, of operation content determined based on the current state of the vehicle and the past traveling records.

2. The guidance system according to claim 1, wherein:

the acquisition device is configured to be connected to an in-vehicle network of the vehicle and is provided with a receiver of a satellite positioning system, and is configured to determine the current state of the vehicle based on traveling information from the in-vehicle network and position information from the receiver; and the server device is configured to extract traveling records matching the current state of the vehicle from among the large number of traveling records, to select a traveling record having a short vehicle traveling time from among the extracted traveling records, and to determine the operation content using the vehicle operation information of the selected traveling record.

3. The guidance system according to claim 2, wherein:

each of the traveling records includes a kind of the vehicle at the time of recording and a kind of a tire of the vehicle at the time of recording;

the notification device is configured to set the kind of vehicle driven by the driver and the kind of the tire of the vehicle driven by the driver; and the server device is configured to extract traveling records matching the current state of the vehicle, the kind of the vehicle driven by the driver, and the kind of the tire of the vehicle driven by the driver from among the large number of traveling records, to select a traveling record having the short vehicle traveling time from among the extracted traveling records, and to determine the operation content using the vehicle operation information of the selected traveling record.

4. The guidance system according to claim 3, wherein:

each of the traveling records includes weather of the traveling road at the time of recording and road surface temperature of the traveling road at the time of recording;

the server device is configured to acquire the weather of the traveling road of the vehicle driven by the driver and the road surface temperature of the traveling road of the vehicle driven by the driver; and the server device is configured to extract traveling records matching the current state of the vehicle, the kind of the vehicle driven by the driver, the kind of the tire of the vehicle driven by the driver, the weather of the traveling road of the vehicle driven by the driver, and the road surface temperature of the traveling road of the vehicle driven by the driver from among the large number of traveling records, to select the traveling record having the short vehicle traveling time from among the extracted traveling records, and to determine the operation content using the vehicle operation information of the selected traveling record.

5. The guidance system according to claim 1, wherein the operation content to be notified to the driver includes at least one of an accelerator operation, a brake operation, a steering operation, and a shift operation.

6. The guidance system according to claim 1, wherein the notification device is configured to notify the operation content by stimulating at least one of visual, auditory, and tactile sensations of the driver.

7. A guidance method of providing a driver of a vehicle with guidance on a driving operation, the guidance method comprising:

accumulating, by a server device, past traveling records on a traveling road on which the vehicle travels;

accumulating, by the server device, a large number of traveling records, each of the traveling records including vehicle traveling time at a time of recording, vehicle traveling information at the time of recording, and vehicle operation information at the time of recording, wherein:

the vehicle traveling information includes at least one of a change over time in a position of the vehicle, a direction of the vehicle, a speed of the vehicle, and a horizontal acceleration of the vehicle while the vehicle travels once around the traveling road; and the vehicle operation information includes at least one of a change over time in an accelerator operation, a brake operation, a steering operation, and a shift operation while the vehicle travels once around the traveling road;

acquiring, by an acquisition device, a current state of the vehicle; and notifying, by a notification device, the driver, while driving, of operation content determined based on the current state of the vehicle and the past traveling records.

8. A guidance system that provides a driver of a vehicle with guidance on a driving operation, the guidance system comprising:

a server device configured to:

accumulate past traveling records on a traveling road on which the vehicle travels; and accumulate a large number of traveling records, each of the traveling records including vehicle traveling time at a time of recording, vehicle traveling information at the time of recording, and vehicle operation information at the time of recording, wherein:

the vehicle traveling information includes at least one of a change over time in a position of the vehicle, a direction of the vehicle, a speed of the vehicle, and a horizontal acceleration of the vehicle while the vehicle travels once around the traveling road; and the vehicle operation information includes at least one of a change over time in an accelerator operation, a brake operation, a steering operation, and a shift operation while the vehicle travels once around the traveling road;

an acquisition device configured to acquire a current state of the vehicle; and a notification device configured to notify the driver, while driving, of operation content determined based on the current state of the vehicle and the past traveling records, wherein:

the acquisition device is configured to be connected to an in-vehicle network of the vehicle and is provided with a receiver of a satellite positioning system, and is configured to determine the current state of the vehicle based on traveling information from the in-vehicle network and position information from the receiver;

the server device is configured to extract traveling records matching the current state of the vehicle from among the large number of traveling records, to select a traveling record having a short vehicle traveling time from among the extracted traveling records, and to determine the operation content using the vehicle operation information of the selected traveling record;

each of the traveling records includes a kind of the vehicle at the time of recording and a kind of a tire of the vehicle at the time of recording;

the notification device is configured to set the kind of vehicle driven by the driver and the kind of the tire of the vehicle driven by the driver; and the server device is configured to extract traveling records matching the current state of the vehicle, the kind of the vehicle driven by the driver, and the kind of the tire of the vehicle driven by the driver from among the large number of traveling records, to select a traveling record having the short vehicle traveling time from among the extracted traveling records, and to determine the operation content using the vehicle operation information of the selected traveling record.

9. The guidance system according to claim 8, wherein:

each of the traveling records includes weather of the traveling road at the time of recording and road surface temperature of the traveling road at the time of recording;

the server device is configured to acquire the weather of the traveling road of the vehicle driven by the driver and the road surface temperature of the traveling road of the vehicle driven by the driver; and the server device is configured to extract traveling records matching the current state of the vehicle, the kind of the vehicle driven by the driver, the kind of the tire of the vehicle driven by the driver, the weather of the traveling road of the vehicle driven by the driver, and the road surface temperature of the traveling road of the vehicle driven by the driver from among the large number of traveling records, to select the traveling record having the short vehicle traveling time from among the extracted traveling records, and to determine the operation content using the vehicle operation information of the selected traveling record.

* * * * *